United States Patent
Foege

(10) Patent No.: US 9,309,810 B2
(45) Date of Patent: Apr. 12, 2016

(54) SYSTEM FOR CONVERTING GASEOUS FUEL INTO LIQUID FUEL

(71) Applicant: Electro-Motive Diesel, Inc., Lagrange, IL (US)

(72) Inventor: Aaron Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 658 days.

(21) Appl. No.: 13/715,536

(22) Filed: Dec. 14, 2012

(65) Prior Publication Data

US 2014/0165587 A1 Jun. 19, 2014

(51) Int. Cl.
*F02C 7/22* (2006.01)
*F25J 1/00* (2006.01)
*F25J 1/02* (2006.01)
*F02C 6/20* (2006.01)
*F01D 15/00* (2006.01)
*F01D 15/02* (2006.01)
*F02C 6/06* (2006.01)
*C10G 5/06* (2006.01)

(52) U.S. Cl.
CPC ... *F02C 7/22* (2013.01); *C10G 5/06* (2013.01); *F01D 15/005* (2013.01); *F01D 15/02* (2013.01); *F02C 6/06* (2013.01); *F02C 6/20* (2013.01); *F25J 1/005* (2013.01); *F25J 1/007* (2013.01); *F25J 1/0022* (2013.01); *F25J 1/023* (2013.01); *F25J 1/0204* (2013.01); *F25J 1/0221* (2013.01); *F25J 1/0251* (2013.01); *F25J 1/0275* (2013.01); *F25J 1/0283* (2013.01); *F25J 2210/40* (2013.01); *F25J 2230/22* (2013.01); *F25J 2230/30* (2013.01); *F25J 2240/10* (2013.01); *F25J 2240/80* (2013.01); *F25J 2270/14* (2013.01)

(58) Field of Classification Search
CPC .................. F25J 1/0022–1/0025; F25J 1/004; F25J 1/0028–1/023; F25J 1/0047; F25J 2260/60; F01D 12/005; F02C 6/04–6/08; F23R 3/286
See application file for complete search history.

(56) References Cited

U.S. PATENT DOCUMENTS

| | | | | |
|---|---|---|---|---|
| 2,900,796 A * | 8/1959 | Morrison | ............... | F25J 1/0022 62/613 |
| 3,735,600 A * | 5/1973 | Dowdell | ............... | F25J 1/0282 62/619 |
| 3,766,583 A * | 10/1973 | Phelps | ............... | B63B 35/4413 114/256 |
| 4,285,917 A * | 8/1981 | Knight | ............... | B01D 53/002 423/220 |
| 4,419,114 A * | 12/1983 | May | ............... | C07C 7/09 62/611 |
| 5,139,548 A * | 8/1992 | Liu | ............... | F25J 1/0022 60/39.12 |
| 5,473,900 A * | 12/1995 | Low | ............... | F25J 1/0022 62/611 |
| 6,248,794 B1 * | 6/2001 | Gieskes | ............... | C01C 1/0488 423/359 |
| 7,071,236 B2 | 7/2006 | Fischer et al. | | |
| 7,673,476 B2 * | 3/2010 | Whitesell | ............... | F25J 1/0202 62/613 |
| 2012/0131950 A1 | 5/2012 | Kölscheid et al. | | |

* cited by examiner

*Primary Examiner* — Phutthiwat Wongwian
*Assistant Examiner* — Rene Ford
(74) *Attorney, Agent, or Firm* — Finnegan, Henderson, Farabow, Garrett & Dunner, LLP

(57) ABSTRACT

A system for converting gaseous fuel into liquid fuel is provided. The system may have a combustor configured to receive a supply of gaseous fuel. The system may also have a gas compressor configured to direct gaseous fuel from the supply into the combustor. The system may also have an air compressor configured to direct compressed air into the combustor, and a turbine in fluid communication with an outlet of the combustor. The turbine may be connected to drive the gas compressor and the air compressor. The system may also have at least one heat exchanger in fluid communication with an outlet of the gas compressor and an outlet of the air compressor. The system may also have at least one expander in fluid communication with an outlet of the at least one heat exchanger. The system may also have a condenser in fluid communication with an outlet of the at least one expander.

20 Claims, 2 Drawing Sheets

SYSTEM FOR CONVERTING GASEOUS FUEL INTO LIQUID FUEL

TECHNICAL FIELD

The present disclosure is directed to a conversion system and, more particularly, to a system for converting gaseous fuel into liquid fuel.

BACKGROUND

When transporting natural gas, the most efficient means is to transport it in a liquid state. Liquefied natural gas ("LNG") takes up only a fraction (about 1/600) of the volume of natural gas in its gaseous state, and is transported by tanker ships or trains equipped with cryogenic compartments. LNG is stored in cryogenic compartments either at or slightly above atmospheric pressure. To produce LNG, natural gas is cooled below its boiling point (about −161° C. at ambient pressure). While it is practical to transport LNG because it takes up a fraction of the volume of natural gas in its gaseous state, natural gas is usually required in its gaseous state for combustion. LNG may be converted into its gaseous form by raising the temperature of the LNG.

Converting natural gas to and from its liquid and gaseous states at a desired location is critical for efficient transportation and use. For instance, transporting natural gas as LNG to a location for on-site use and converting LNG into compressed natural gas ("CNG") on-site is preferred over transporting natural gas in its bulky, gaseous form. Similarly, CNG may be preferably converted into LNG at a reclamation site for transportation to another location. While a portable system for converting CNG into LNG is preferred, the conversion requires a substantial amount of energy, limiting the portability of many systems to locations with access to a utility grid. Further, it is critical to reduce the amount of energy used during conversion of natural gas into LNG, particularly for small-batch conversion, because a substantial amount of energy is required.

One attempt at converting natural gas into LNG efficiently is described in U.S. Pat. No. 7,071,236 ("the '236 patent") issued to Fischer et al. on Jul. 4, 2006. In particular, the '236 patent describes a method for liquefying natural gas by cooling, expanding, and separating the natural gas. The natural gas is chilled by a first heat exchanger, which is primarily cooled by a closed-loop cooling system. The chilled gas is expanded in a first turbine to produce a first liquid fraction and a first gas fraction, and directed to a first separator. The first liquid fraction collects at the bottom of the first separator and is released to a second heat exchanger. After being chilled in the second heat exchanger, the chilled first liquid fraction is expanded in a second turbine to produce a second liquid fraction and a second gas fraction, and directed to a second separator. The second liquid fraction collects at the bottom of the second separator and is released from the system as LNG. The second gas fraction collects at the top of the second separator and serves as a coolant for the second heat exchanger before being directed to a compressor. Meanwhile, the first gas fraction collects at the top of the first separator and serves as a coolant for the first heat exchanger, in addition to the closed-loop cooling system, before being directed to the compressor. The compressor compresses the first and second gas fractions and directs the compressed gas to a Fischer-Tropsch unit ("FT unit").

The FT unit provides, at least partly, the energy required for the recompression of coolants used in the closed-loop cooling system. The process performed in the FT unit is exothermic and the heat produced during the reaction is used to produce steam. The steam is expanded in turbines that drive the compressors used to compress the coolants in the closed-loop cooling system.

Although the method of the '236 patent may help convert natural gas into LNG, the method may be limited. That is, the method of the '236 patent requires an FT unit that relies on steam to produce power. This complicates the system because a water supply must be maintained apart from the supplies in the system. Further, the system requires additional components, such as the FT unit, which complicates the system and limits portability of the system based on equipment size and availability and system requirements. As the FT unit only drives the compressors that compress coolant in the closed-loop cooling system, the system may still require a utility grid or other energy source to drive the compressors outside of those powered by the FT unit.

The disclosed system is directed to overcoming one or more of the problems set forth above and/or elsewhere in the prior art.

SUMMARY

In one aspect, the disclosure is directed toward a system for converting gaseous fuel into liquid fuel. The system may include a combustor configured to receive a supply of gaseous fuel, and a gas compressor configured to direct gaseous fuel from the supply into the combustor. The system may also include an air compressor configured to direct compressed air into the combustor, and a turbine in fluid communication with an outlet of the combustor. The turbine may be connected to drive the gas compressor and the air compressor. The system may further include at least one heat exchanger in fluid communication with an outlet of the gas compressor and an outlet of the air compressor. At least one expander in fluid communication with an outlet of the at least one heat exchanger may also be included in the system. The system may further include a condenser in fluid communication with an outlet of the at least one expander.

In another aspect, the disclosure is directed toward a method for converting gaseous fuel into liquid fuel. The method may include compressing gaseous fuel and directing compressed gaseous fuel into a combustor. The method may also include compressing air and directing air to mix with compressed gaseous fuel and create a fuel/air mixture within the combustor. The method may further include combusting the fuel/air mixture within the combustor to generate a heated exhaust flow, and converting heat energy from the heated exhaust flow into mechanical work. The mechanical work may be used to compress and direct gaseous fuel and air. Cooling a portion of the gaseous fuel may also be included in the method. The method may further include expanding the cooled portion of gaseous fuel, and condensing the expanded and cooled portion of gaseous fuel to convert the gaseous fuel into liquid fuel.

DETAILED DESCRIPTION

Figure 1:
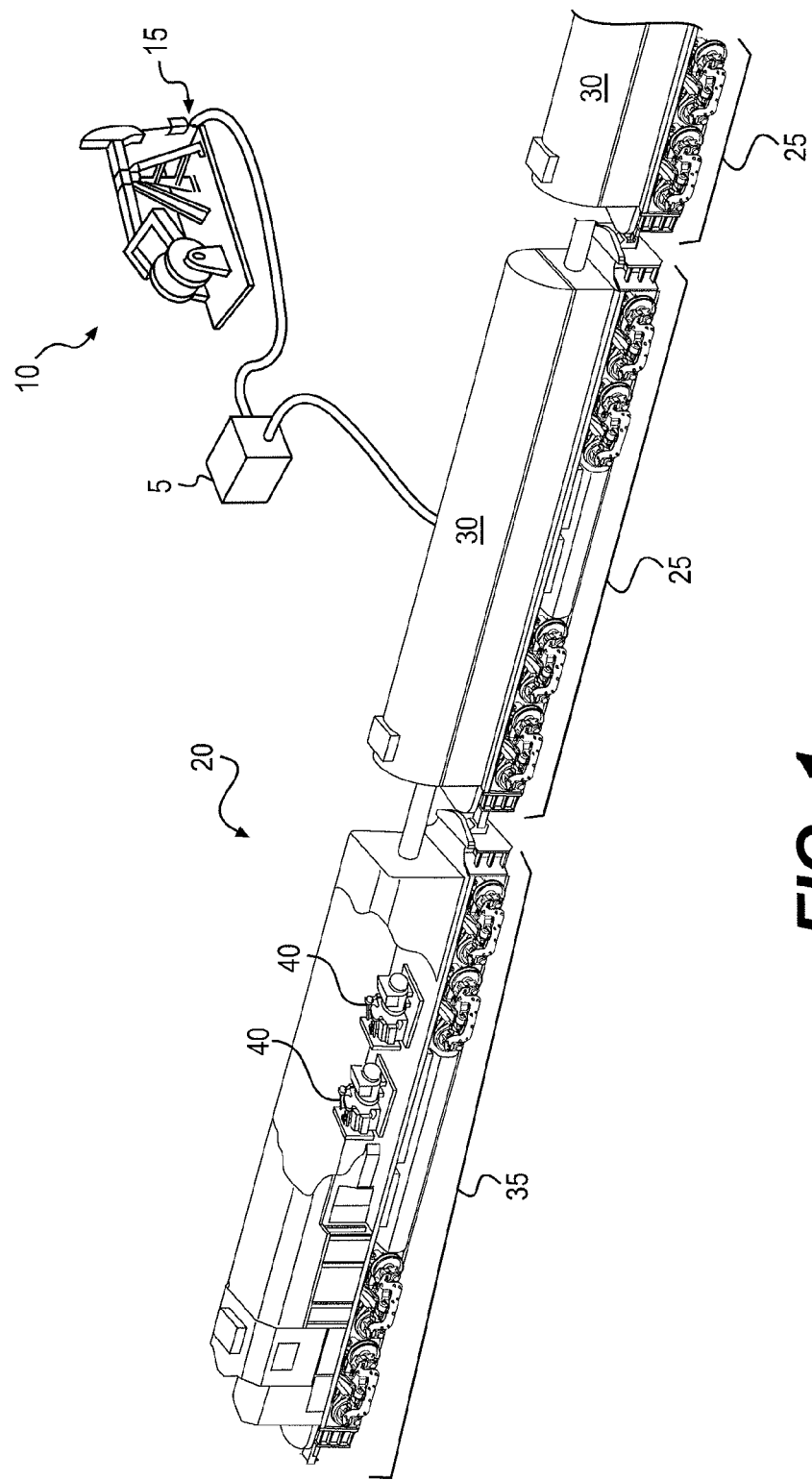
FIG. 1 is a pictorial illustration of an exemplary disclosed reclamation site.

FIG. 1 illustrates placement of an exemplary disclosed conversion system 5 at a reclamation site 10. As shown in FIG. 1, conversion system 5 may be housed near a source 15 having a supply of gaseous fuel, and a train consist 20 may park at reclamation site 10 to receive liquid fuel from conversion system 5. In one embodiment, source 15 may be one or more gaseous fuel storage tanks at reclamation site 10. In another embodiment, source 15 may be a component or system of components that draws gaseous fuel from the ground. Conversion system 5 may be in fluid communication with source 15 and with a tender car 25 of train consist 20. Tender car 25 may house a liquid fuel storage tank 30 configured to maintain temperatures at or below about −161° Celsius, at or slightly above ambient atmospheric pressure. A locomotive 35 of train consist 20 may have one or more engines 40 supplied with fuel from conversion system 5 while parked at reclamation site 10 and/or liquid fuel storage tank 30 while parked or during transit.

Alternatively, in another embodiment, conversion system 5 may be housed at least partly in tender car 25. Conversion system 5 may be configured to operate independent of or in compliment to engines 40. One skilled in the art will understand and appreciate the portability of conversion system 5 based on the system's components and functionality described below.

Figure 2:
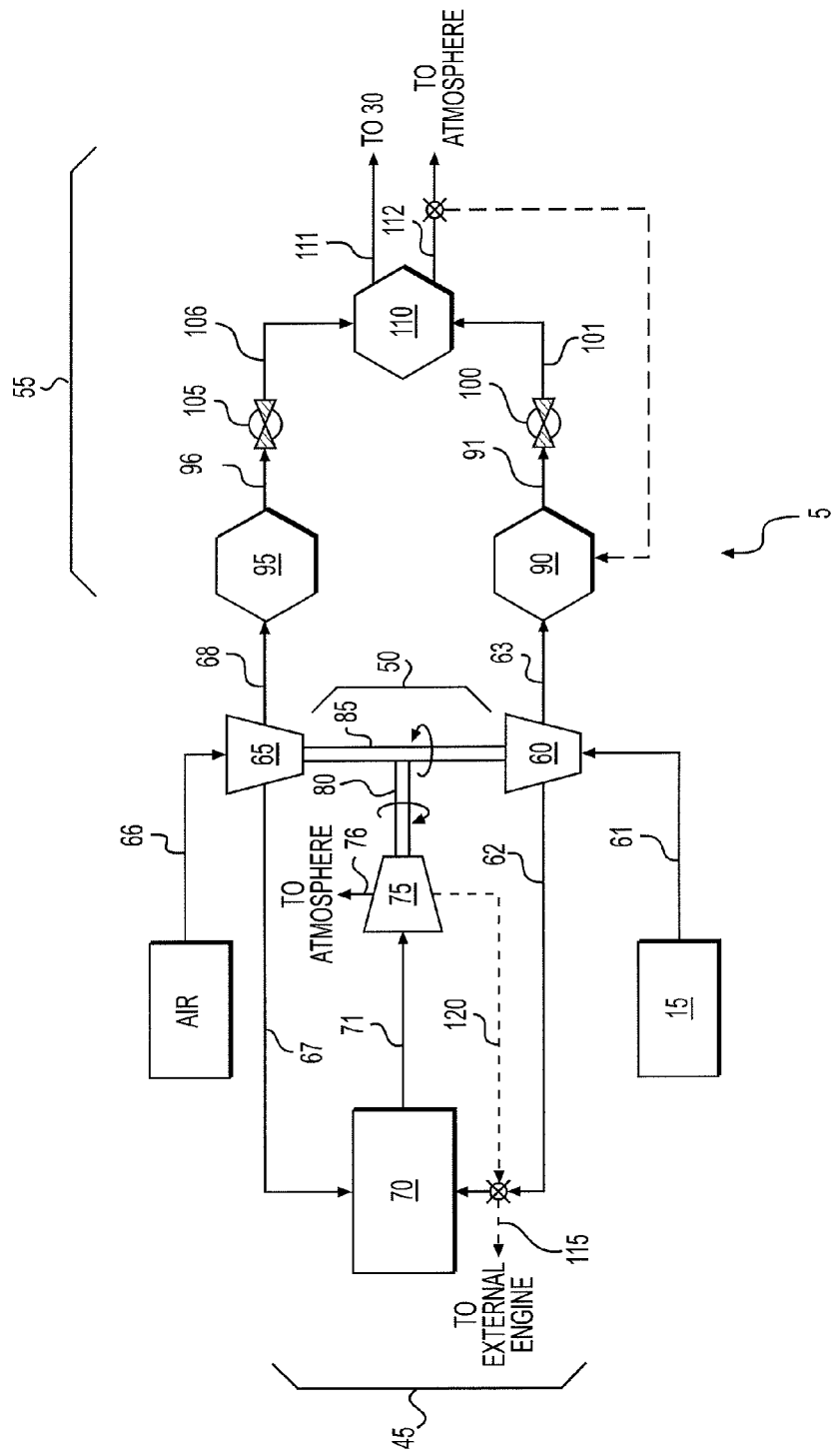
FIG. 2 is a diagrammatic illustration of an exemplary disclosed conversion system that may be used at the reclamation site of FIG. 1.

FIG. 2 illustrates a diagrammatic view of conversion system 5. In the embodiment shown, conversion system 5 may include a combusting subsystem 45, a power subsystem 50, and a cooling subsystem 55. Combusting subsystem 45 may facilitate combustion of gaseous fuel to generate heat energy, which may be passed on to power subsystem 50. Power subsystem 50 may convert heat energy from combusting subsystem 45 into mechanical work to drive one or more components in combusting subsystem 45 and cooling subsystem 55. Cooling subsystem 55 may facilitate conversion of gaseous fuel into liquid fuel.

Combusting subsystem 45 may include components that cooperate to combust gaseous fuel to generate heat energy. In particular, combusting subsystem 45 may include a gas compressor 60 connected to receive gaseous fuel from source 15 via a conduit 61, an air compressor 65 configured to compress air, and a combustor 70. Gas compressor 60 may be mechanically driven to draw gaseous fuel from source 15 via conduit 61, and compress the gaseous fuel. The gaseous fuel may then be directed to combustor 70 via a conduit 62 at a pressure of about 2 to 50 psi. Gas compressor 60 may also be connected via a conduit 63 to direct gaseous fuel at a pressure of about 2,300 kpa to a component in cooling subsystem 55. The work of gas compressor 60 may increase the temperature of the gaseous fuel. For instance, the gaseous fuel directed to a component in cooling subsystem 55 may have a temperature of about 813° C. Air compressor 65 may draw air from the atmosphere or from an air storage tank via a conduit 66, and be mechanically driven to compress the air. The compressed air may then be directed into combustor 70 via a conduit 67. Air compressor 65 may also be connected via a conduit 68 to direct compressed air at a pressure of about 10,000 kpa to a component in cooling subsystem 55. The work of air compressor 65 may increase the temperature of the compressed air. For instance, the compressed air directed to a component in cooling subsystem 55 may have a temperature of about 842° C. Combustor 70 may facilitate combustion of the gaseous fuel from gas compressor 60 and the air from air compressor 65 to generate heat energy for use by power subsystem 50. Combustor 70 may include a gaseous fuel combustion chamber capable of combusting a fuel/air mixture to generate a heated exhaust flow. Following combustion, combustor 70 may release the heated exhaust flow to components of power subsystem 50 via a conduit 71.

Power subsystem 50 may convert heat energy from combusting subsystem 45 into mechanical work used to drive components of combusting subsystem 45 and cooling subsystem 55. In particular, power subsystem 50 may include a turbine 75 and one or more shafts 80 and 85. Turbine 75 may receive the heated exhaust flow generated by combustor 70 via conduit 71. Turbine 75 may then convert heat energy from the heated exhaust flow into mechanical work, and release the heated exhaust flow to the atmosphere via a conduit 76. Shafts 80 and 85 may pass mechanical work from turbine 75 to components in combusting subsystem 45 and cooling subsystem 55. In particular, shafts 80 and 85 may connect turbine 75 with gas compressor 60 and air compressor 65, respectively.

After receiving mechanical work from power subsystem 50, cooling subsystem 55 may convert gaseous fuel into liquid fuel. In particular, cooling subsystem 55 may include a first heat exchanger 90, a second heat exchanger 95, a first expander 100, a second expander 105, and a condenser 110. First heat exchanger 90 and first expander 100 chill the gaseous fuel prior to directing it to condenser 110. First heat exchanger 90 may receive the gaseous fuel from gas compressor 60 via a conduit 63. First heat exchanger 90 may chill the gaseous fuel using the atmosphere by intercooling the gaseous fuel. In one embodiment, first heat exchanger 90 may be configured to chill gaseous fuel received at a temperature of about 813° C. and about 2,300 kpa to a temperature slightly above ambient atmospheric temperature (e.g., about 30° C. on a 25° C. day) and about 2,300 kpa. First heat exchanger 90 may direct the chilled gaseous fuel to first expander 100 via a conduit 91, and release heat to the atmosphere by allowing it to radiate outward from first heat exchanger 90. First expander 100 may expand the chilled gaseous fuel from first heat exchanger 90, and direct the chilled and expanded gaseous fuel to condenser 110 via a conduit 101. In one embodiment, first expander 100 may decrease the temperature of the chilled gaseous fuel from about 30° C. and about 2300 kpa to about −190° C. and ambient atmospheric pressure.

Second heat exchanger 95 and second expander 105 may chill the air prior to directing it to condenser 110. Second heat exchanger 95 may receive the air from air compressor 65 via a conduit 68. Second heat exchanger 95 may chill the air using the atmosphere by intercooling the air. In one embodiment, second heat exchanger may be configured to chill air received at a temperature of about 842° C. and 10,000 kpa to a temperature slightly above ambient atmospheric temperature (e.g., about 30° C. on a 25° C. day) and about 10,000 kpa. Second heat exchanger 95 may direct the chilled air to second expander 105 via a conduit 96, and release heat to the atmosphere by allowing it to radiate outward from second heat exchanger 95. Second expander 105 may expand the chilled air from second heat exchanger 95, and direct the chilled and expanded air to condenser 110 via a conduit 106. In one embodiment, second expander 105 may decrease the temperature of the air from about 30° C. and about 10,000 kpa to about −190° C. and ambient atmospheric pressure.

Condenser 110 may receive the chilled and expanded gaseous fuel from first expander 100 and the chilled and expanded air from second expander 105. Using the air to further chill the gaseous fuel, condenser 110 may condense the chilled and expanded gaseous fuel to convert the gaseous fuel into liquid fuel. In one embodiment, condenser may convert natural gas into LNG by removing about 510 KJ from every KG of natural gas. In this embodiment, the air or the thermal mass of the natural gas itself may absorb the energy. After converting gaseous fuel into liquid fuel, condenser 110 may separately release the liquid fuel to liquid fuel storage tank 30 via a conduit 111 and cold air to the atmosphere via a conduit 112. In one embodiment, condenser 110 may release the liquid fuel at a temperature of about −161° C. and ambient atmospheric pressure and the cold air at a temperature of about −161° C. and ambient atmospheric pressure.

The cold air released by condenser 110 may be used in other ways. In one embodiment, condenser 110 may direct the cold air to first heat exchanger 90, as shown via conduit 112. In another embodiment, condenser 110 may direct the cold air to second heat exchanger 95 via conduit 112 (not shown). In yet another embodiment, condenser 110 may direct the cold air to air compressor 65 (not shown).

It is contemplated that cooling subsystem 55 could alternatively operate with a single heat exchanger and a single expander, instead of the disclosed separate components, if desired. In such an embodiment, the gaseous fuel and the air may flow through the heat exchanger and the expander via separate lines or in alternating flows.

Conversion system 5 may be, at least partially, self-powering. In one embodiment, gas compressor 60 and air compressor 65 may be driven by only turbine 75. In this embodiment, mechanical work converted from heat energy of the heated exhaust flow released by turbine 75 may be the only source of work used to compress and direct the gaseous fuel and the air.

In addition to converting gaseous fuel into liquid fuel for more efficient transportation, conversion system 5 may compress a portion of the gaseous fuel for use in other applications. For instance, conversion system 5 may release compressed gaseous fuel from gas compressor 60 to an external engine, e.g. to engines 40 of train consist 20 or to an on-site generator (not shown), via a conduit 115. Alternatively, gas compressor 60 may direct the compressed gaseous fuel to a compressed gaseous fuel storage tank via conduit 115, if desired.

The heated exhaust flow released by turbine 75 may be used in different ways. In one embodiment, turbine 75 may be in fluid communication with the gaseous fuel between source 15 and combustor 70 via a conduit 120, and may direct a portion of the heated exhaust flow to mix with the gaseous fuel. By mixing exhaust with the gaseous fuel prior to combustion, the exhaust may preheat the fuel/air mixture prior to combustion and/or change attributes of the fuel/air mixture.

In another embodiment, turbine 75 may be in further fluid communication with an external engine, e.g. engines 40. In this embodiment, turbine 75 may direct the heated exhaust flow to mix with the fuel entering the engine. Turbine 75 may direct up to 50% of the heated exhaust flow to the engine, which may introduce nitrogen and water into the compressed gaseous fuel and provide positive effects for NOx reduction when injected into the engine.

INDUSTRIAL APPLICABILITY

The disclosed system may be simple and portable, and enable use of gaseous fuel to power components within the system. Conversion system 5 may also achieve high fuel efficiency and help reduce NOx emissions, as some of the heated exhaust flow released from turbine 75 may be recirculated back into conversion system 5. Operation of conversion system 5, specifically the interaction between combusting subsystem 45, power subsystem 50, and cooling subsystem 55, will now be explained with reference to FIG. 2.

Combusting subsystem 45 may combust gaseous fuel to generate heat energy for power subsystem 50. Specifically, source 15 may direct gaseous fuel to gas compressor 60 via conduit 61. Gas compressor 60 may compress the gaseous fuel and direct it to combustor 70 via conduit 62. Gas compressor 60 may direct the gaseous fuel to combustor 70 in varying volumes and at varying flow rates based on several factors, including the design of combustor 70 and an amount and pressure of the air supplied to combustor 70 by air compressor 65. Air compressor 65 may draw air from the atmosphere or an air storage tank via conduit 66. Air compressor 65 may then compress the air, and direct it to combustor 70 via conduit 67. Air compressor 65 may direct the air to combustor 70 in varying volumes and at varying flow rates based on several factors, including the design of combustor 70 and the amount of gaseous fuel supplied to combustor 70 by gas compressor 60. Inside combustor 70, the gaseous fuel may mix with the air to create a fuel/air mixture, and combustor 70 may combust the fuel/air mixture to generate a heated exhaust flow. Combustor 70 may direct the heated exhaust flow to turbine 75 via conduit 71 to provide heat energy for power subsystem 50.

Power subsystem 50 may convert heat energy from combusting subsystem 45 into mechanical work to drive components in combusting subsystem 45 and cooling subsystem 55. After receiving the heated exhaust flow from combustor 70 via conduit 71, turbine 75 may convert heat energy from the heated exhaust flow into mechanical work. Turbine 75 may convey the mechanical work to gas compressor 60 and air compressor 65 via shafts 80 and 85.

Cooling subsystem 55 may use a portion of the compressed gaseous fuel and air to convert the gaseous fuel into liquid fuel. Upon receiving mechanical work from shafts 80 and 85, gas compressor 60 may compress the gaseous fuel received from source 15 via conduit 61, and direct it to first heat exchanger 90 via conduit 63. Gas compressor 60 may direct the gaseous fuel to first heat exchanger 90 in varying volumes and at varying flow rates based on several factors, including design of first heat exchanger 90 and the ambient atmospheric temperature. Air compressor 65 may also receive mechanical work from shafts 80 and 85, and may compress the air received from the atmosphere via conduit 66, and direct the air to second heat exchanger 95 via conduit 68. Air compressor 65 may direct the air to second heat exchanger 95 in varying volumes and at varying flow rates based on several factors, including design of second heat exchanger 95 and the ambient atmospheric temperature.

First heat exchanger 90 may chill the gaseous fuel from gas compressor 60 using the atmosphere by intercooling the gaseous fuel. First heat exchanger 90 may direct the chilled gaseous fuel to first expander 100 via conduit 91, and release heat to the atmosphere by allowing it to radiate outward from first heat exchanger 90. Second heat exchanger 95 may chill the air from air compressor 65 using the atmosphere by intercooling the air. Second heat exchanger 95 may direct the air to second expander 105 via conduit 96, and release heat to the atmosphere by allowing it to radiate outward from second heat exchanger 95. First expander 100 may expand the chilled gaseous fuel and direct it to condenser 110 via conduit 101. Second expander 105 may expand the chilled air and direct it to condenser 110 via conduit 106. Condenser 110 may use the chilled and expanded air to further chill the chilled and expanded gaseous fuel and convert the gaseous fuel into liquid fuel. Condenser 110 may release the liquid fuel to liquid fuel storage tank 30 via conduit 111 and the cold air to the atmosphere via conduit 112.

The cold air released by condenser 110 may be used in other ways. In one embodiment, condenser 110 may direct the cold air to first heat exchanger 90 as shown via conduit 112 to help first heat exchanger 90 chill the gaseous fuel. In another embodiment, condenser 110 may direct the cold air to second heat exchanger via conduit 112 to help second heat exchanger 95 chill the air (not shown). In yet another embodiment, condenser 110 may direct the cold air to air compressor 65 via conduit 112 to chill the air prior to entering cooling subsystem 55 (not shown).

The heated exhaust flow released by turbine 75 may be used in a variety of ways. In one embodiment, turbine 75 may direct a portion of the heated exhaust flow to mix with gaseous fuel prior to combustion in combustor 70. In another embodiment, turbine 75 may direct a portion of the heated exhaust flow to mix with the compressed gaseous fuel via conduit 120, which may be directed to the external engine via conduit 115.

Conversion system 5 may be simple. In particular, conversion system 5 may not require that a water supply be maintained. Further, conversion system 5 may not require additional components, such as an FT unit, which can complicate the system.

Conversion system 5 may be portable. In particular, because conversion system 5 may not require an FT unit, the size of conversion system 5 may be smaller. In one embodiment, conversion system 5 may be housed at least partly in tender car 25 to facilitate transportation to on-site locations.

Conversion system 5 may also be self-powering. By combusting gaseous fuel within the system to power components within the system, conversion system 5 may not require a utility grid or other external source of heat or power.

In addition to simplicity, improved portability, and being self-powering, conversion system 5 may also employ the heated exhaust flow released by turbine 75 to improve performance of conversion system 5 and combustor 70. In particular, the heated exhaust flow may be recirculated into combustor 70 to reduce NOx emissions. This exhaust recirculation may be handled without external components on the engine and may be varied to achieve different exhaust compositions or to benefit the exhaust of an external engine.

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A system for converting gaseous fuel into liquid fuel, comprising:
    a combustor configured to receive a supply of gaseous fuel from a gaseous fuel source;
    a gas compressor with a first gaseous fuel outlet configured to direct gaseous fuel from the supply into the combustor;
    an air compressor with a first air outlet configured to direct compressed air into the combustor;
    a turbine in fluid communication with an outlet of the combustor and connected to drive the gas compressor and the air compressor;
    a first heat exchanger in fluid communication with a second gaseous fuel outlet of the gas compressor;
    a second heat exchanger in fluid communication with a second air outlet of the air compressor;
    at least one expander in fluid communication with an outlet of the first heat exchanger; and
    a condenser in fluid communication with an outlet of the at least one expander.

2. The system of claim 1, wherein:
    the at least one expander includes a first and a second expander; and
    the combustor, gas compressor, air compressor, turbine, first heat exchanger, second heat exchanger, first expander, second expander, and condenser are housed together at a reclamation site.

3. The system of claim 1, wherein the turbine is connected to direct a portion of a heated exhaust flow into the combustor.

4. The system of claim 1, wherein the gas compressor and the air compressor are driven by only the turbine.

5. The system of claim 1, wherein:
    the at least one expander includes a first and a second expander;
    the combustor, gas compressor, air compressor, turbine, first heat exchanger, second heat exchanger, first expander, second expander, and condenser are housed together at a reclamation site; and
    the condenser is in fluid communication with a tender car parked at the reclamation site.

6. The system of claim 1, wherein:
    the at least one expander includes a first and a second expander; and an outlet of the condenser is in fluid communication with an inlet of the first heat exchanger.

7. The system of claim 1, wherein:
    the at least one expander includes a first and a second expander; and
    an outlet of the condenser is in fluid communication with an inlet of the air compressor.

8. The system of claim 1, wherein;
    the at least one expander includes a first and a second expander; and
    an outlet of the condenser is in fluid communication with an inlet of the second heat exchanger.

9. The system of claim 1, wherein the gas compressor is in fluid communication with an external engine.

10. The system of claim 1, wherein:
    the at least one expander includes a first and a second expander;
    the first heat exchanger is configured to cool gaseous fuel from about 8130 C. and 2,300 kpa to about 300 C. and 2,300 kpa;
    the second heat exchanger is configured to cool compressed air from about 8420 C. and 10,000 kpa to about 300 C. and 10,000 kpa;
    the first expander is configured to cool gaseous fuel from about 300 C. and 2,300kpa to about −190° C. and atmospheric pressure; and
    the second expander is configured to cool compressed air from about 300 C. and 10,000 kpa to about −1900 C. and atmospheric pressure.

11. A method of converting gaseous fuel into liquid fuel, comprising:
    compressing gaseous fuel with a gas compressor, directing a first portion of compressed gaseous fuel into a combustor, and directing a second portion of compressed gaseous fuel into a heat exchanger;
    compressing air and directing compressed air to mix with the first portion of compressed gaseous fuel and create a fuel/air mixture within the combustor;
    combusting the fuel/air mixture within the combustor to generate a heated exhaust flow;
    converting heat energy from the heated exhaust flow into mechanical work used to compress and direct gaseous fuel and air;
    cooling the second portion of the gaseous fuel with the heat exchanger;

expanding the cooled second portion of gaseous fuel; and
condensing the expanded and cooled second portion of gaseous fuel to convert the second portion of gaseous fuel into liquid fuel.

12. The method of claim 11, further including:
cooling the air;
expanding the cooled air; and
cooling the expanded and cooled portion of gaseous fuel with the expanded and cooled air.

13. The method of claim 11, further including directing a portion of the heated exhaust flow into the combustor.

14. The method of claim 11, further including directing a portion of the compressed gaseous fuel to an external engine.

15. The method of claim 11, further including:
directing a portion of the heated exhaust flow to mix with a portion of the compressed gaseous fuel; and
directing a mixture of compressed gaseous fuel and heated exhaust to an external engine.

16. The method of claim 11, wherein compressing gaseous fuel, directing air, combusting the fuel/air mixture, converting heat energy, cooling, expanding, and condensing are conducted at a reclamation site.

17. The method of claim 16, further including directing the liquid fuel to a tender car parked at the reclamation site.

18. The method of claim 11, further including:
cooling the air;
expanding cooled air;
cooling the expanded and cooled portion of gaseous fuel with expanded and cooled air; and
using cooled air in cooling the portion of the gaseous fuel.

19. The method of claim 11, wherein mechanical work converted from the heat energy of the heated exhaust flow is the only work used in compressing the gaseous fuel and directing the air.

20. A method of converting natural gas into LNG, comprising:
compressing natural gas with a gas compressor, directing a first portion of compressed natural gas from a supply into a combustor, and directing a second portion of compressed natural gas into a heat exchanger;
compressing ambient air and directing ambient air to mix with the first portion of compressed natural gas and create a fuel/air mixture within the combustor;
combusting the fuel/air mixture in the combustor to generate a heated exhaust flow;
converting heat energy from the heated exhaust flow into mechanical work used to compress and direct the natural gas and the ambient air;
cooling [a]the second portion of the compressed natural gas from about 8130 C. and 2,300 kpa to about 300 C. and 2,300 kpa;
cooling a portion of the compressed ambient air from about 8420 C. and 10,000 kpa to about 300 C. and 10,000 kpa;
expanding the cooled second portion of natural gas to drop the temperature of the natural gas to about −190° C. and atmospheric pressure;
expanding the cooled portion of ambient air to drop the temperature of the natural gas to about −190° C. and atmospheric pressure; and
using the expanded and cooled portion of ambient air to further cool and condense the expanded and cooled second portion of natural gas to convert the second portion of natural gas into LNG.

\* \* \* \* \*